United States Patent [19]

Sakano et al.

[11] Patent Number: 5,786,817
[45] Date of Patent: Jul. 28, 1998

[54] METHOD AND APPARATUS FOR SETTING RETENTION PERIOD OF E-MAIL BASED ON VISUAL SCREEN SELECTION

[75] Inventors: Akio Sakano, Ibaraki; Michiru Maeji, Kanagawa, both of Japan

[73] Assignee: Sony Corporation, Tokyo, Japan

[21] Appl. No.: 650,268

[22] Filed: May 22, 1996

[30] Foreign Application Priority Data

May 31, 1995 [JP] Japan .................. 7-134522

[51] Int. Cl.$^6$ .................................. G06F 3/00
[52] U.S. Cl. .................... 345/339; 707/206
[58] Field of Search .................. 395/616, 622,
395/339, 968, 347, 348; 345/333, 334,
339, 348, 961; 707/206

[56] References Cited

U.S. PATENT DOCUMENTS

| | | | |
|---|---|---|---|
| 5,032,989 | 7/1991 | Tornetta | 705/1 |
| 5,086,390 | 2/1992 | Mathews | 364/410 |
| 5,107,419 | 4/1992 | MacPhail | 707/99 |
| 5,428,778 | 6/1995 | Brookes | 707/5 |
| 5,598,279 | 1/1997 | Ishii et al. | 358/402 |
| 5,659,599 | 8/1997 | Arumainayagam et al. | 379/89 |
| 5,689,699 | 11/1997 | Howell et al. | 380/4 |

FOREIGN PATENT DOCUMENTS

| | | |
|---|---|---|
| 5095369 | 4/1993 | Japan . |
| 5095369A | 4/1993 | Japan . |
| 6209314A | 7/1994 | Japan . |

OTHER PUBLICATIONS

"Cyber Promotions Attacked by Anti-Junkmail Hackers," Elec. Mail & Messaging Systems, 19 May 1997, vol. 21, No. 10.
"To Meet the Millennium," Air Transport World, Sep. 1997 p. 96.
"Win Rules", Banyan Systems Inc. Dec. 1994.
Krten, R., "Improving Usenet News Performance", Dr. Dobb's J., May 1996, v. 12, n. 5, p.66(4).
Rigney, S., "POWERLan," PC Magazine, Apr. 14, 1992, v. 11, n. 7, p. 344(3).
Salemi, J., "Teamsync, Version1.33", PC Magazine, Jun. 14, 1994, v. 13, No. 11, p. 199(2).

*Primary Examiner*—A. Katbab
*Attorney, Agent, or Firm*—Jay H. Maioli

[57] ABSTRACT

An information managing apparatus for managing received electronic mail has a memory for successively storing entered electronic mail, a CPU having a program for managing the electronic mail stored by the memory, a display unit for displaying electronic mail managed by the CPU, and a tablet for making an entry relative to the electronic mail displayed by the display unit. The tablet allows the user to establish a retention period with respect to the displayed electronic mail. The CPU stores the electronic mail with the retention period added thereto in the memory and deletes the electronic mail with the added retention period which has expired as detected by comparison with a timer at a given period of time.

15 Claims, 7 Drawing Sheets

METHOD AND APPARATUS FOR SETTING RETENTION PERIOD OF E-MAIL BASED ON VISUAL SCREEN SELECTION

BACKGROUND OF THE INVENTION

1. Field of the Invention

The present invention relates to a method of and an apparatus for managing information such as information contained in electronic mail, for example.

2. Description of the Prior Art

In apparatus for sending and receiving electronic mail, it has been customary to manage received electronic mail by creating folders for the received electronic mail and establishing retention periods respectively for the folders.

However, the conventional process is complex because it is necessary to place electronic mail received by the user into respective folders. Furthermore, since the folders cannot be used for the purpose of classifying received electronic mail according to the type of electronic mail and senders, limitations are posed on the management of electronic mail.

According to one proposed solution, the displayed information of electronic mail contains areas for indicating mail nonerasability, and any electronic mail with a certain mark displayed in that area cannot be erased. The proposed process allows the number of nonerasable electronic mail to increase gradually, resulting in a wasteful occupation of memory space, because no retention periods can be specified.

Therefore, it has heretofore been impossible to efficiently and easily manage electronic mail. The user tends to save all electronic mail that appears to be needed, of all the electronic mail that has been received by the user. As a consequence, the available memory space is wastefully occupied, and it is a time-consuming process to retrieve a saved electronic mail.

SUMMARY OF THE INVENTION

It is therefore an object of the present invention to provide a method of and apparatus for managing information such as electronic mail information without a wasteful occupation of memory space and without a time-consuming process to retrieve a saved electronic mail.

According to the present invention, there is provided a method of managing information, comprising the steps of establishing a retention period with respect to information which is entered from an external source, storing the information with the retention period added thereto, and deleting the information with the added retention period which has expired as detected by comparison with a timer at a given period of time.

According to the present invention, there is also provided an apparatus for managing information, comprising memory means for successively storing entered information, a CPU having a program for managing the information stored by the memory means, a display unit for displaying the information managed by the CPU, input means for making an entry relative to the information displayed by the display unit, the input means having setting means for establishing a retention period with respect to the information, the CPU having means for storing the information with the retention period added thereto in the memory means and deleting the information with the added retention period which has expired as detected by comparison with a timer at a given period of time.

DETAILED DESCRIPTION OF THE PREFERRED EMBODIMENT

Figure 1:
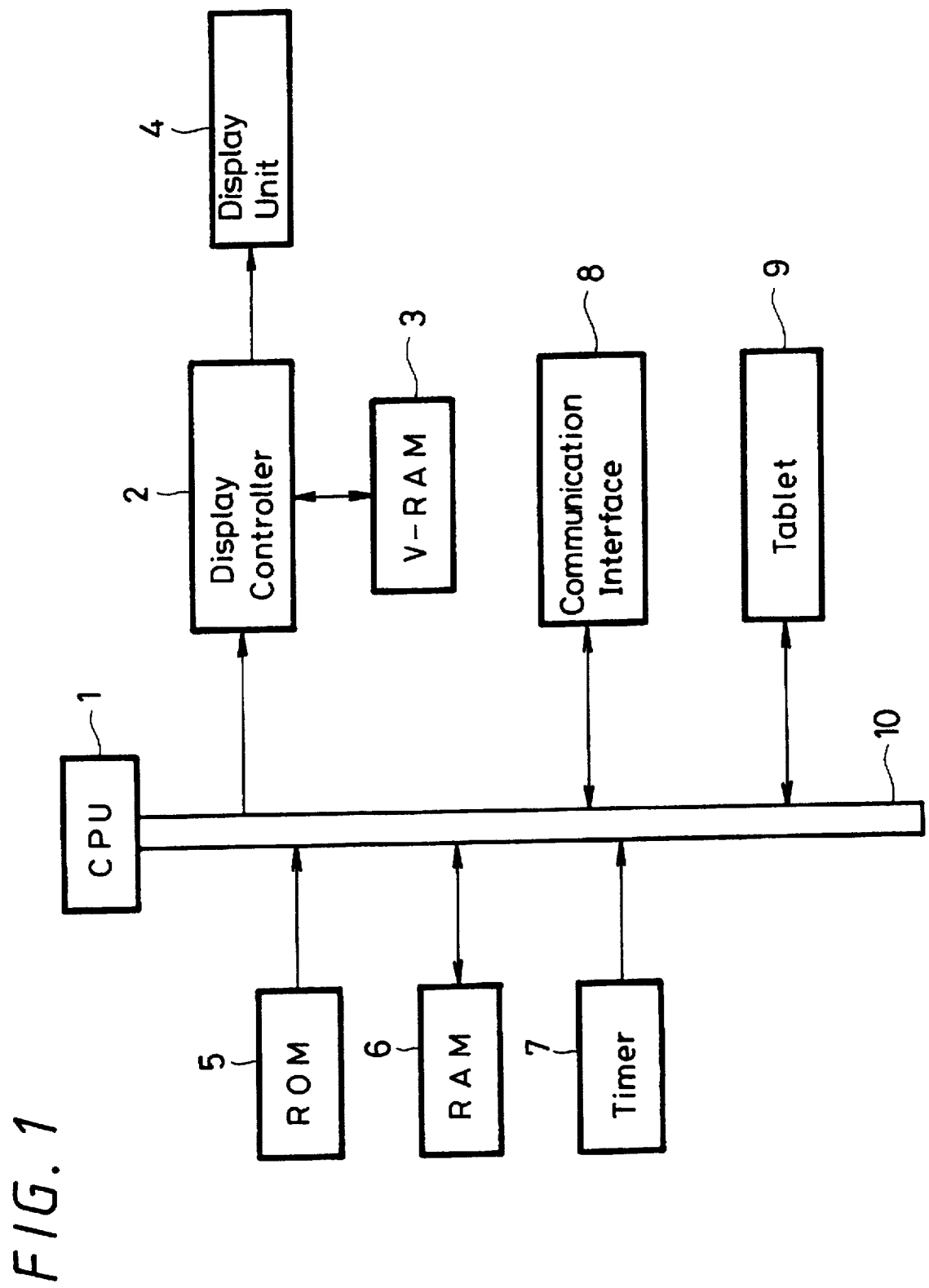
FIG. 1 is a block diagram of an information management apparatus according to the present invention.

As shown in FIG. 1, an information management apparatus according to the present invention includes a CPU 1 connected to a bus line 10, a display controller 2 connected to the bus line 10 for controlling displayed information, a V-RAM 3 connected to the display controller 2 for storing display data, and a display unit 4 connected to the display controller 2 for displaying information.

The information management apparatus also has a ROM 5 connected to the bus line 10 for storing programs, a backed-up RAM 6 connected to the bus line 10 for storing data of electronic mail that is received, and a timer 7 for indicating time in response to a request from the CPU 1.

The information management apparatus further includes a communication interface 8 connected to the bus line 10 for sending and receiving electronic mail, and a tablet 9 connected to the bus line 10 for the user to enter data and instructions therethrough. The tablet 9 may be combined with the display unit 4, for example, so that the user can easily enter data and instructions through the tablet 9 depending on the information that is being displayed on the display unit 4.

Figure 2B:
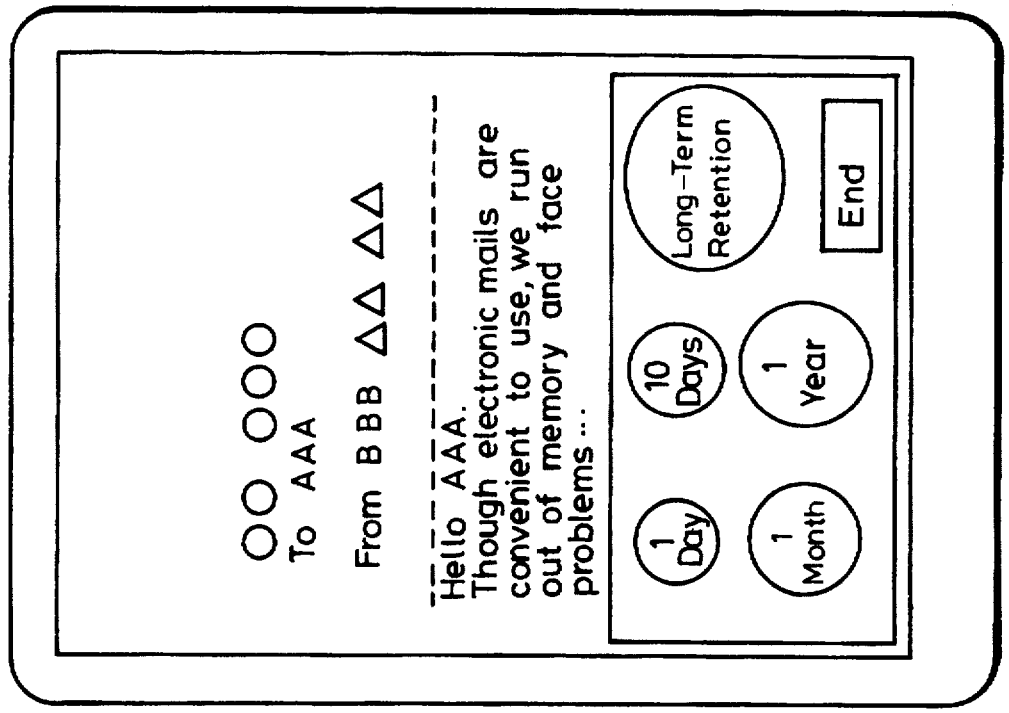
FIGS. 2A, 2B, 2C, and 2D are views showing electronic mail information displayed on the information management apparatus.
Figure 2A:
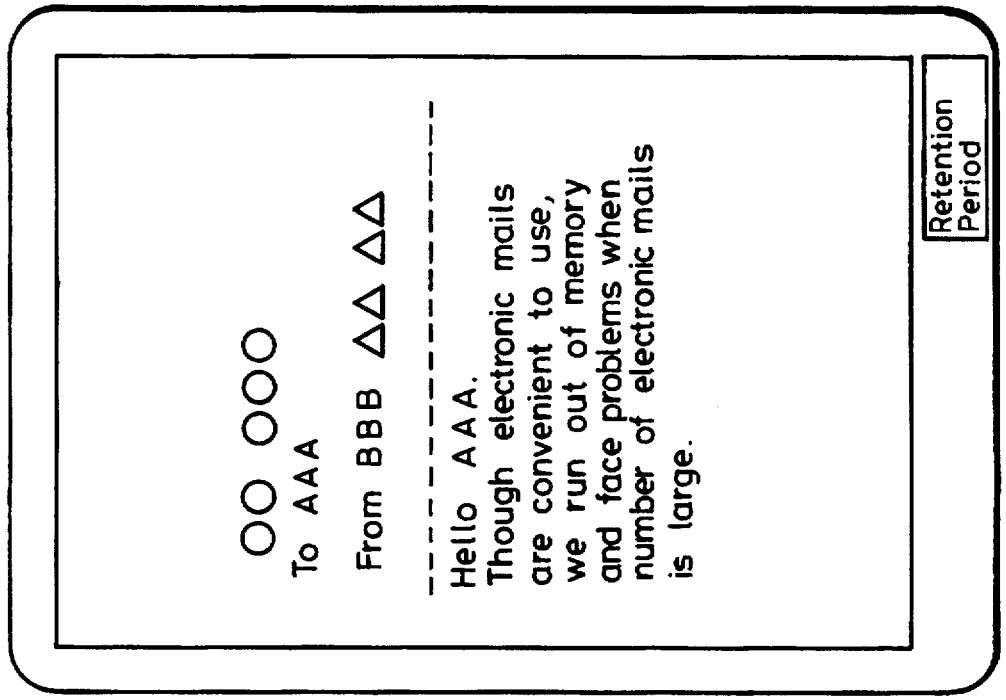

An electronic mail message which is received is displayed on the display unit as shown in FIG. 2A, for example. The displayed electronic mail includes a lower right area which displays letters "RETENTION PERIOD" enclosed in a frame. When the user makes an entry in an area of the tablet 9 which is superposed on the displayed "RETENTION PERIOD", the information management apparatus starts a mode for establishing a retention period.

Figure 3A:
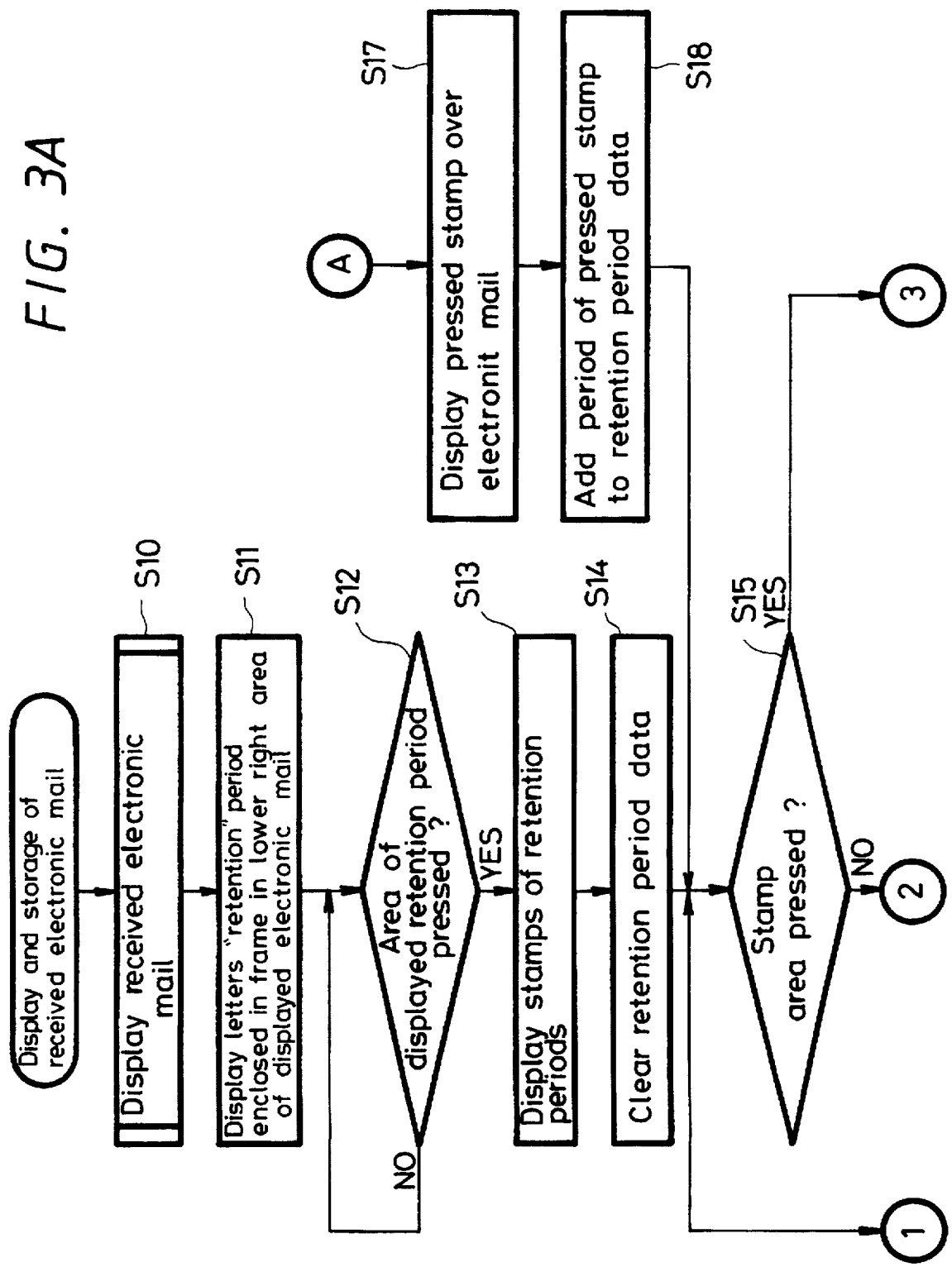
FIGS. 3A and 3B are flowcharts of an operation sequence of the information management apparatus.
Figure 3B:
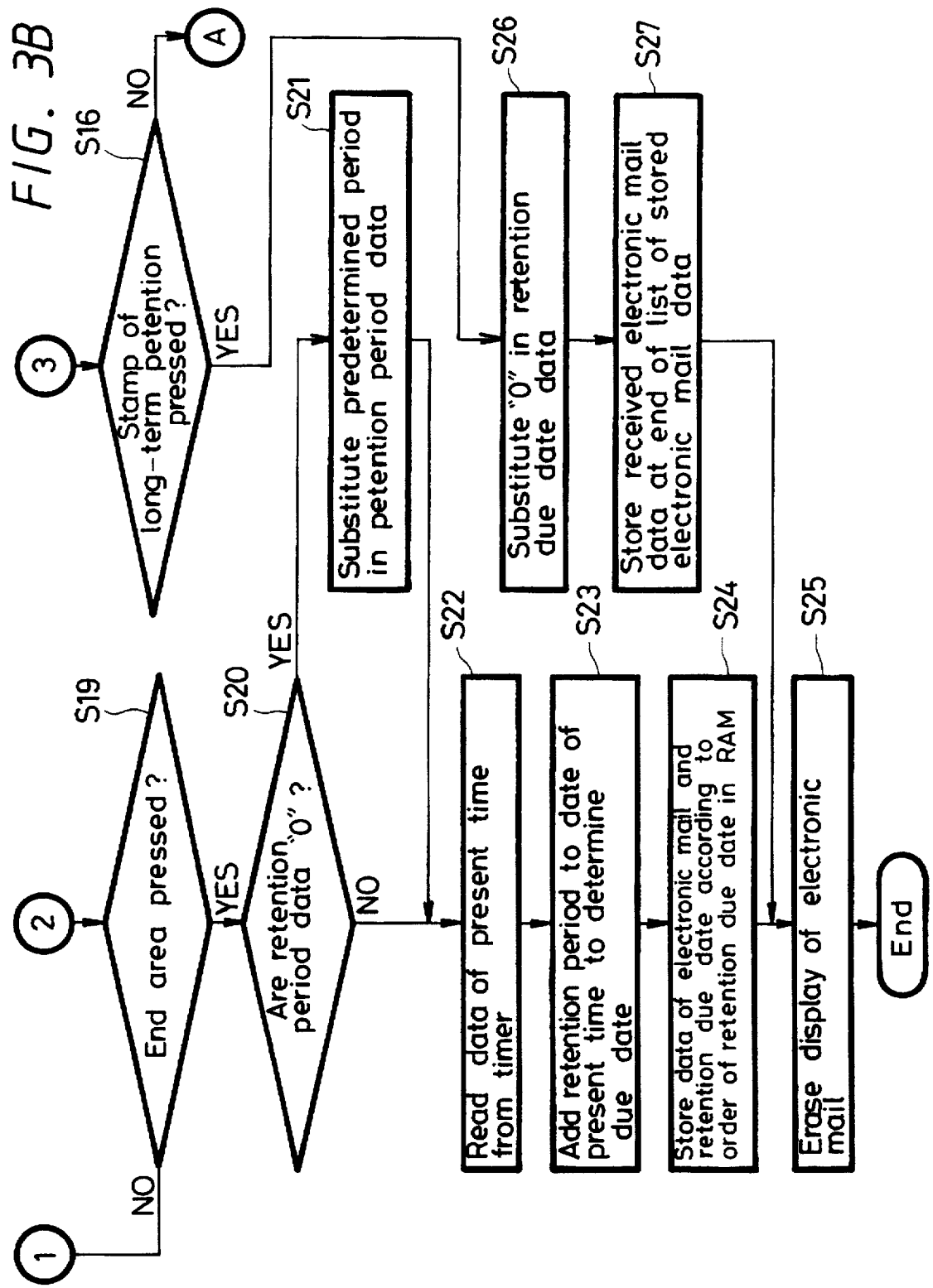

In the mode for establishing a retention period, the information management apparatus operates according to an operation sequence shown in FIGS. 3A and 3B. The operation sequence shown in FIGS. 3A and 3B is directed to the display and storage of a received electronic mail message.

When the operation sequence for the display and storage of a received electronic mail message is initiated, a received electronic mail message is displayed according to a known process in a step S10. In the displayed electronic mail, letters "RETENTION PERIOD" enclosed in a frame are displayed in a lower right area in a step S11. The display unit 4 now displays a message as shown in FIG. 2A, for example.

It is then determined in a step S12 whether or not the user makes an entry in an area of the tablet 9 which is superposed on the displayed letters "RETENTION PERIOD". The step S12 is repeated until the user makes an entry ("NO" in the step S12). If the user makes an entry in the step S12 ("YES" in the step S12), then the display unit 4 displays a means for establishing a retention period as shown in FIG. 2B, for example, in a step S13.

Specifically, the display unit 4 displays periods of one day, ten days, one month, and one year, and long-term retention. Each of the displayed items comprises the length of a period encircled in a circular graphic pattern, which is referred to as a stamp. The display unit 4 also displays letters "END" enclosed in a frame. When the display unit 4 displays these stamps, the letters "RETENTION PERIOD" are not displayed.

In a next step S14, a variable of retention period data for storing the total of retention periods, described later on, is cleared. It is then determined in a step S15 whether or not the user has made an entry in an area of the tablet 9 which is superposed on any one of the stamps.

If the user makes an entry at any one of the stamps ("YES" in the step S15), then it is determined in a step S16 whether or not the user has made an entry at the stamp of long-term retention. If "NO" in the step S16, then the display unit 4 displays a graphic pattern similar to the stamp at which the user has made an entry, over the displayed electronic mail as shown in FIG. 2C, in a step S17.

In a step S18, the period marked in the stamp at which the user has made an entry is added to the above retention period data. Then, control goes back to the step S15. If the user has made an entry at any of the stamps again in the step S15, the steps S15–S18 are repeated. The period marked in the stamp at which the user has made an entry is added to the retention period data. In this manner, a desired retention period is established.

Figure 2D:
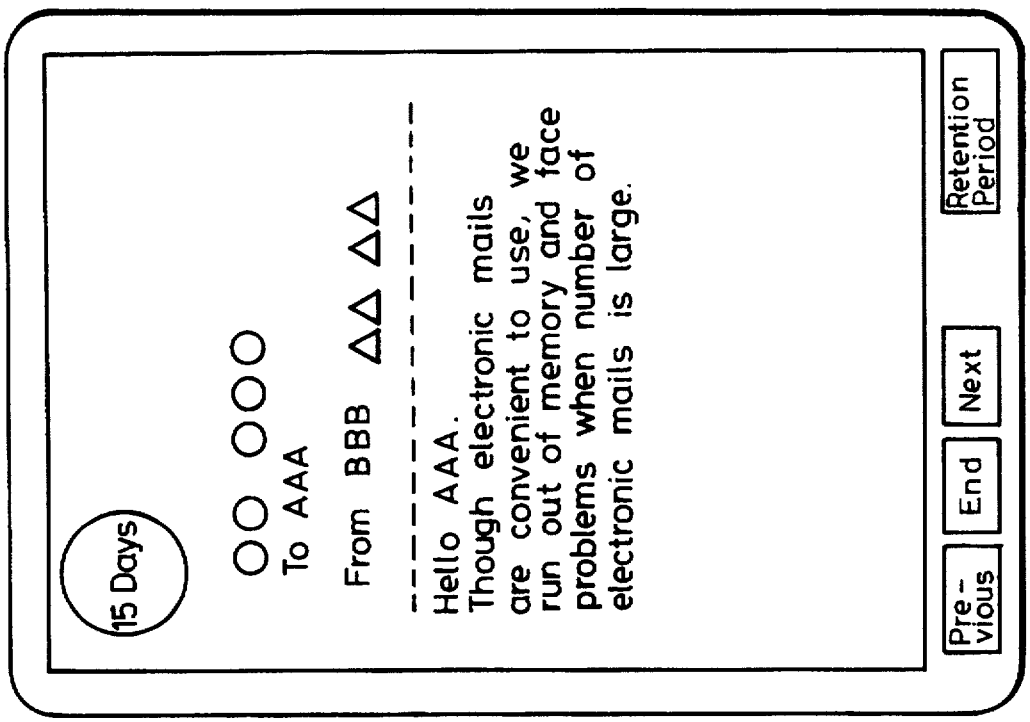
Figure 2C:
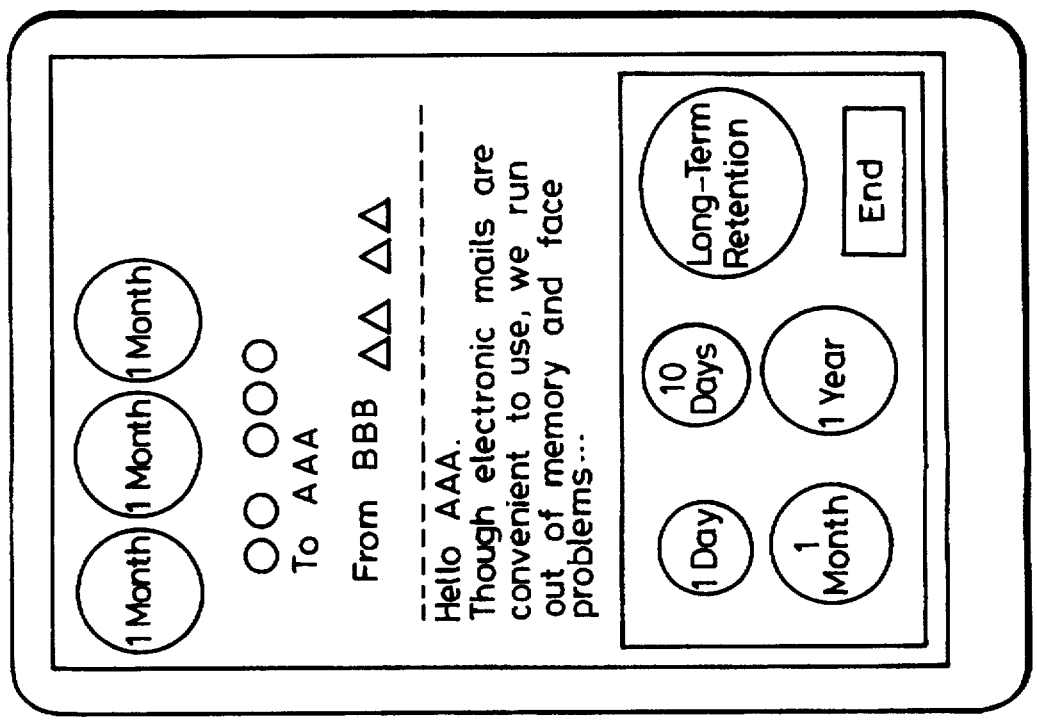

In FIG. 2C, the user has made three entries at the displayed stamp which represents one month. In this case, retention period data indicative of three months is established, and three graphic patterns similar to the displayed stamp which represents one month are displayed over an upper area of the displayed electronic mail, indicating that the retention period is three months.

If the user has made no entry at any of the stamps again ("NO" in the step S15), then it is determined in a step S19 whether or not the user has made an entry in an area of the tablet 9 which is superposed on the displayed letters "END". The steps S15, S19 are repeated until the user makes an entry ("NO" in the step S19).

If the user has made an entry at the displayed letters "END" ("YES" in the step S19), it is determined in a step S20 whether the established retention period data represent "0" or not. If the retention period data represent "0" ("YES" in the step S20), then a predetermined period, e.g., three days, is substituted in the retention period data in a step S21.

If the retention period data do not represent "0" ("NO" in the step S20) or after a predetermined period is substituted in the retention period data in the step S21, the date of the present time is read from the timer 7 in a step S22, and the retention period data are added to the date in a step S23, thereby producing data of a retention due date.

The data of the received electronic mail and the data of the retention due date are stored according to the order of the retention due date in the RAM 6 in a step S24.

Thereafter, the displayed electronic mail is deleted from the display unit 4 in a step S25, and the processing is ended.

If the user has made an entry at the stamp of long-term retention ("YES" in the step S16), then "0" is substituted in the data of the retention due date in a step S26, and thereafter the data of the received electronic mail is stored at the end of the list of electronic mail data stored in the RAM 27 in a step S27. Then, the displayed electronic mail is deleted from the display unit 4 in the step S25, and the processing is ended.

Figure 4:
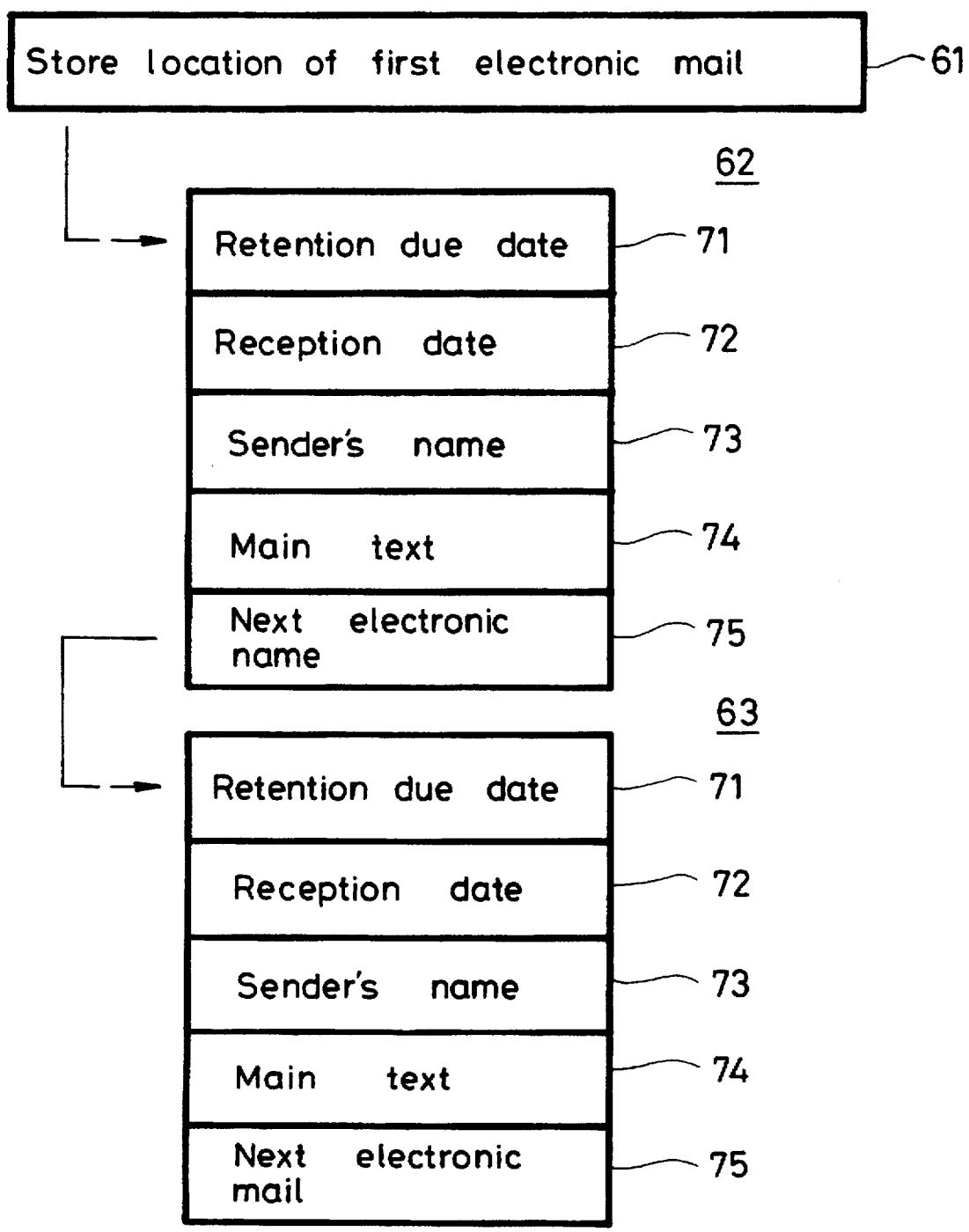
FIG. 4 is a diagram showing the manner in which received electronic mail is stored in the information management apparatus.

The electronic mail data is stored in the RAM 6 as shown in FIG. 4.

In FIG. 4, the location (starting address) of a first electronic mail message is stored in an area 61 of the RAM 6, and the first electronic mail message, denoted at 62, is saved from an address indicated by the area 61. The saved data of the electronic mail message 62 includes data 71 of a retention due date, data 72 of a reception date, data 73 of a sender's name, data 74 of a main text, and data 75 of the location (starting address) of a next electronic mail message.

The next electronic mail message, denoted at 63, is saved from an address indicated by the data 75. The saved data of the electronic mail message 63 include data 71 of a retention due date, data 72 of a reception date, data 73 of a sender's name, data 74 of a main text, and data 75 of the location (starting address) of a next electronic mail message. In this fashion, data of electronic mail is saved in chained succession.

The data 75 of a final electronic mail message represents "0", indicating that the electronic mail is final. The saved electronic mail is arranged in the order of retention due dates, for example, for shortening the time required to retrieve electronic mail whose retention periods have expired or, for the deletion of those electronic mail, as described later on.

The received electronic mail is displayed and saved and retention periods (retention due dates) are established in the manner described above.

Figure 5:
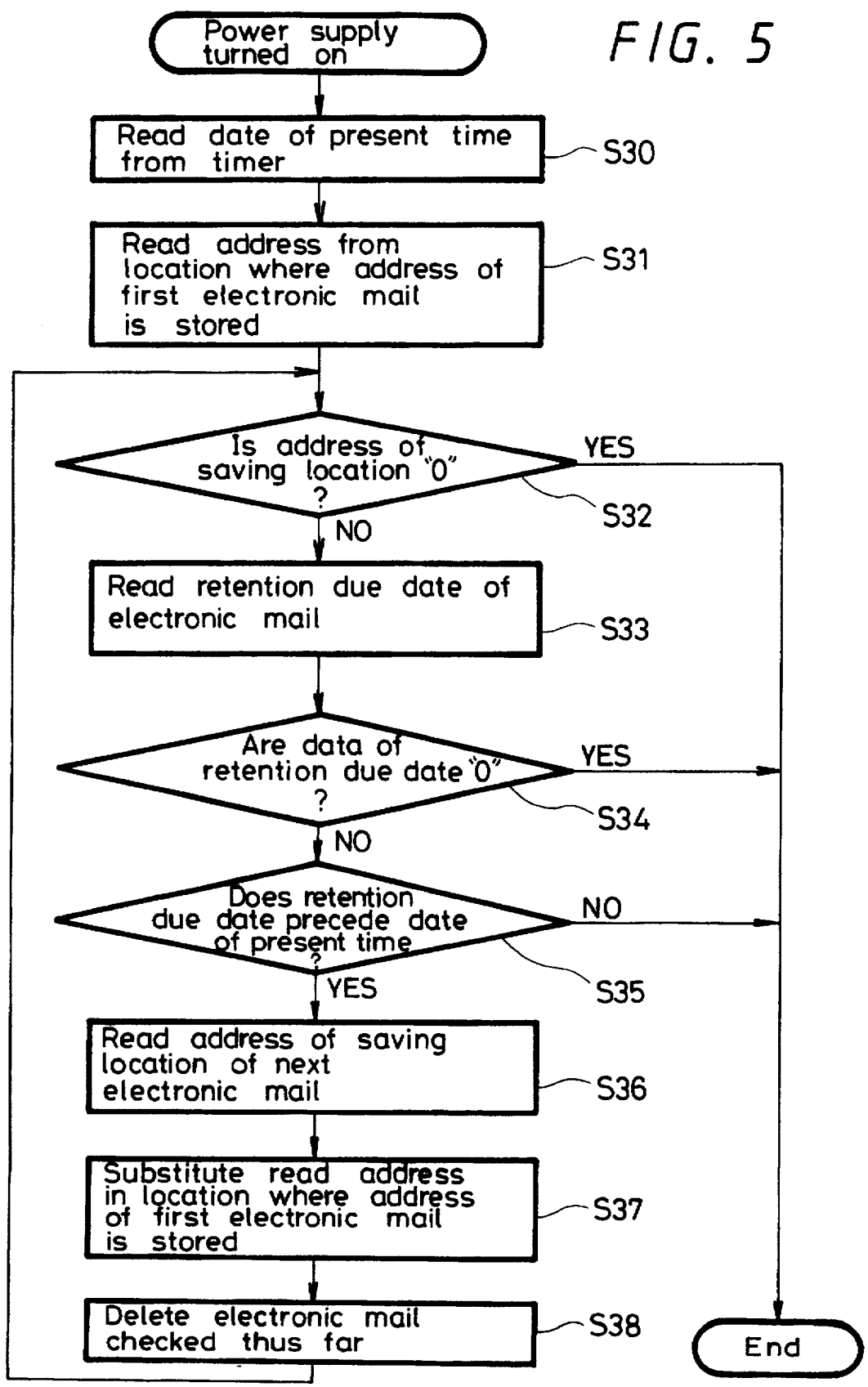
FIG. 5 is a flowchart of an operation sequence of the information management apparatus.

An electronic mail whose retention period has expired is deleted according to an operation sequence shown in FIG. 5. The operation sequence shown in FIG. 5 is carried out when the power supply of the information management apparatus is turned on.

In FIG. 5, when the power supply of the information management apparatus is turned on, a date of the present time is read from the timer 7 in a step S30. Then, the location (starting address) where a first electronic mail is saved is read from the area 61 of the RAM 6 in a step S31.

It is determined in a step S32 whether the address indicative of the saving location is "0" or not. If the address indicative of the saving location is "0" ("YES" in the step S32), then since it means that no electronic mail is saved, the processing is ended.

If the address indicative of the saving location is not "0" ("NO" in the step S32), then the data 71 of the retention due date in the electronic mail saved at this address are read in a step S33. It is then determined in a step S34 whether the data 71 of the retention due date in the electronic mail is "0" or not.

If the data 71 of the retention due date in the electronic mail is "0" ("YES" in the step S34), then it means that this electronic mail is saved for long-term retention. Since saved electronic mail is arranged in the order of retention due dates, there is no electronic mail whose retention period has expired after the above electronic mail. Consequently, the processing is ended.

If the data 71 of the retention due date in the electronic mail is not "0" ("NO" in the step S34), then it is determined in a step S35 whether the data 71 of the retention due date in the electronic mail precede the date of the present time or not. If the data 71 of the retention due date in the electronic mail do not precede the date of the present time ("NO" in the step S35), then since there is no electronic mail whose retention period has expired after this electronic mail, the processing is ended.

If the data 71 of the retention due date in the electronic mail precede the date of the present time ("YES" in the step S35), then the data 75 of the location (starting address) of a next electronic mail message is read in a step S36.

In a next step S37, the location (starting address) of a next electronic mail message which has been read in the step S36 is substituted in the area 61 of the RAM 6.

In a step S38, the data of the first electronic mail message which has been checked thus far is deleted according to a known process. Thereafter, control returns to the step S32 to repeat the above processing with respect to an electronic mail whose starting address is stored in the area 61 of the RAM 6.

In this manner, when the power supply of the information management apparatus is turned on, the retention due dates for the data of electronic mail saved in the RAM 6 are determined, and the data of any electronic mail whose retention periods have expired are automatically deleted.

Heretofore, there has been available no appropriate means for managing received electronic mail. According to the present invention, however, retention periods are established with respect to information, e.g., electronic mail information, and the information is stored together with the established retention periods, and any stored information whose retention periods have expired is automatically deleted. Consequently, any memory space is prevented from being unduly wastefully occupied by unwanted information, and the problem of a time-consuming process of retrieving electronic mail that is needed is eliminated.

If an electronic mail message whose retention period has been established as shown in FIG. 2C is called two and one half months later, then the called electronic mail is displayed as shown in FIG. 2D. Specifically, as shown in FIG. 2D, the retention period displayed over the upper area of the electronic mail represents fifteen days encircled in a circular graphic pattern which is slightly smaller than a circular graphic pattern marked around one month.

The size of a graphic pattern which is displayed may be progressively smaller as the remaining retention period encircled in the graphic pattern is progressively shorter. Such a graphic pattern allows the user to well recognize the remaining retention period for better management of electronic mail.

The size of a displayed graphic pattern may be varied based on a remaining retention period which is calculated from the date of the present time from the timer 7 and also the data 71 of the retention due date. Rather than making the size of a displayed graphic pattern progressively smaller, the color or density of a displayed graphic pattern may be varied, or a displayed graphic pattern may be displayed in a flickering fashion at a progressively shorter flickering period.

In the displayed electronic mail shown in FIG. 2D, letters "RETENTION PERIOD" enclosed in a frame may be displayed in a lower right area, as with the displayed electronic mail shown in FIG. 2A. When the user has made an entry in an area of the tablet 9 which is superposed on the displayed letters "RETENTION PERIOD" shown in FIG. 2D, the mode for establishing a retension period may be started for varying the retention period.

The displayed electronic mail shown in FIG. 2D includes a lower left area for displaying letters "PREVIOUS", "NEXT", "END" enclosed in respective frames for viewing other electronic mail or ending the display process.

According to the present invention, as described above, retention periods are established with respect to entered information and added to the information for storage, and any information whose retention periods have expired as detected by comparison with the time from a timer at a given time, is automatically deleted. As a result, the storage capacity of a memory used to store such information is prevented from being wastefully occupied.

The process of determining whether a retention period of information has expired and deleting the information whose retention period has expired may be carried out when a storage capacity of a RAM for storing data of received electronic mail, for example, is required, rather than when the power supply of the information management apparatus is turned on.

The deletion of information whose retention period has expired may not be carried out fully automatically, but may be carried out after the information is displayed for the user to confirm whether it should be deleted or not.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. An apparatus for managing information, comprising:
   memory means for successively storing entered information;
   a CPU having a program for managing the information stored by said memory means;
   a display unit for displaying the information managed by said CPU;
   a timer;
   input means for making an entry of retention period data relative to the information displayed by said display unit;
   said input means having setting means for establishing a retention period with respect to the displayed information from displayed retention period data;
   said CPU having means for adding the retention period to the information and controlling the display unit to display the retention period data with the information, for storing the information with the retention period added thereto in said memory means and for deleting the information with the added retention period which has expired, as detected by comparison with a present time in said timer at a given period of time, wherein said setting means comprises means for independently displaying different units of retention period data on said display unit at the same time with the information and establishing said retention period in response to one or more entries made in relation to any one of said different units of retention period data, and wherein said CPU comprises means for adding a date of a present time to the information and for storing the information with the date of the present time from said timer and said retention period in said memory means.

2. An apparatus according to claim 1, wherein said setting means comprises means for establishing said retention period by accumulating as many units of retention period data as the number of times that entries are made in relation to any one of said different units of retention period data.

3. An apparatus according to claim 1, wherein said input means comprises means for displaying a set of letters enclosed in a frame, and said setting means comprises means for starting a mode to establish the retention period, in order to change the retention period in response to an entry made in an area which is superimposed on the displayed set of letters.

4. An apparatus according to claim 1, wherein said CPU has means for deleting the information with the added retention periods which has expired, at a time depending on a storage capacity of said memory means.

5. A method according to claim 1, further comprising the steps of:

independently displaying different units of retention period data on said display unit; and establishing said retention period in response to an entry made in relation to any one of said different units of retention period data.

6. An apparatus for managing information, comprising:

memory means for successively storing entered information;

a CPU having a program for managing the information stored by said memory means;

a display unit for displaying the information managed by said CPU;

a timer;

input means for making an entry of retention period data relative to the information displayed by said display unit;

said input means having setting means for establishing a retention period with respect to the displayed information from displayed retention period data;

said CPU having means for adding the retention period to the information and controlling the display unit to display the retention period data with the information, for storing the information with the retention period added thereto in said memory means and for deleting the information with the added retention period which has expired, as detected by comparison with a present time in said timer at a given period of time, wherein said setting means comprises means for independently displaying different units of retention period data on said display unit at the same time with the information and establishing said retention period in response to one or more entries made in relation to any one of said different units of retention period data, and wherein said display unit comprises means for displaying a remaining period of said retention period in relation to said information and for displaying said remaining period in as many graphic patterns related respectively to said different units of retention period data as said different units of retention period data in the vicinity of said information.

7. An apparatus according to claim 6, wherein said graphic patterns are varied in shape depending on said remaining period.

8. An apparatus according to claim 6, wherein said graphic patterns are progressively reduced in size depending on said remaining period.

9. A method of managing information, comprising the steps of:

establishing a retention period with respect to information which is entered from an external source by displaying units of retention period data along with the information, selecting one of the units of displayed retention period data as the retention period, and displaying the selected unit of retention period data at the same time with the information;

adding the established retention period to the information;

storing the information with the retention period added thereto;

deleting the stored information with the retention period which has expired as detected by comparison of the retention period with a timer at a given period of time; and establishing said retention period by accumulating and displaying as many units of retention period data as the number of times that entries are made in relation to a selected one of said different units of retention period data.

10. A method of managing information comprising the steps of:

establishing a retention period with respect to information which is entered from an external source by displaying units of retention period data along with the information, selecting one of the units of displayed retention period data as the retention period, and displaying the selected unit of retention period data at the same time with the information;

adding the established retention period to the information;

storing the information with the retention period added thereto;

displaying a remaining period of said retention period in relation to said information;

independently displaying different units of time on a display unit;

establishing said retention period in response to an entry made in relation to any one of said different units of time; and displaying said remaining period in as many graphic patterns related respectively to said different units of time as said different units of time in the vicinity of said information.

11. A method according to claim 10 further comprising making an entry relative to said displayed remaining period.

12. A method according to claim 10 further comprising changing said retention period in response to said entry made.

13. A method according to claim 10 wherein said entry made is superimposed on a displayed set of letters enclosed in a frame.

14. A method of managing information comprising the steps of:

establishing a retention period with respect to information which is entered from an external source;

adding the established retention period to the information;

storing the information with the retention period added thereto;

displaying a remaining period of said retention period in relation to said information;

independently displaying different units of time on a display unit;

establishing said retention period in response to an entry made in relation to any one of said different units of time; and displaying said remaining period in as many graphic patterns related respectively to said different units of time as said different units of time in the vicinity of said information, wherein said graphic patterns are varied in shape depending on said remaining period.

15. A method of managing information comprising the steps of:

establishing a retention period with respect to information which is entered from an external source;

adding the established retention period to the information;

storing the information with the retention period added thereto;

displaying a remaining period of said retention period in relation to said information;

independently displaying different units of time on a display unit;

establishing said retention period in response to an entry made in relation to any one of said different units of time; and displaying said remaining period in as many graphic patterns related respectively to said different units of time as said different units of time in the vicinity of said information, wherein said graphic patterns are progressively reduced in size depending on said remaining period.

\* \* \* \* \*